(12) United States Patent
Yamakawa et al.

(10) Patent No.: US 6,189,380 B1
(45) Date of Patent: Feb. 20, 2001

(54) FLOW RATE SENSOR

(75) Inventors: Tomoya Yamakawa; Shingo Hamada; Fumiyoshi Yonezawa; Takeharu Oshima; Satoru Kotoh; Hiroyuki Uramachi, all of Tokyo (JP)

(73) Assignee: Mitsubishi Denki Kabushiki Kaisha, Tokyo (JP)

(*) Notice: Under 35 U.S.C. 154(b), the term of this patent shall be extended for 0 days.

(21) Appl. No.: 09/154,983

(22) Filed: Sep. 17, 1998

(30) Foreign Application Priority Data

Mar. 19, 1998 (JP) .................................................. 10-070515

(51) Int. Cl.⁷ ...................................................... G01F 1/68
(52) U.S. Cl. ........................................ 73/204.21; 73/118.2
(58) Field of Search ............................. 73/204.21, 118.2, 73/204.25, 204.26, 204.27, 204.23, 198

(56) References Cited

U.S. PATENT DOCUMENTS

| | | | |
|---|---|---|---|
| 4,210,016 | * 7/1980 | Peter et al. ........................... | 73/116 |
| 4,261,199 | * 4/1981 | Sauer et al. .......................... | 73/204 |
| 4,304,129 | * 12/1981 | Kawai et al. ......................... | 73/204 |
| 4,841,938 | * 6/1989 | Weibler et al. ...................... | 123/494 |
| 5,329,812 | 7/1994 | Tada et al. . | |
| 5,780,737 | * 7/1998 | Ohta et al. ........................ | 73/204.21 |

FOREIGN PATENT DOCUMENTS

| | | |
|---|---|---|
| 7-71985 | 3/1995 | (JP) . |
| 8-5430 | 1/1996 | (JP) . |
| 8-313318 | 11/1996 | (JP) . |

* cited by examiner

Primary Examiner—Benjamin R. Fuller
Assistant Examiner—Jewel V. Thompson
(74) Attorney, Agent, or Firm—Sughrue, Mion, Zinn, Macpeak & Seas, PLLC

(57) ABSTRACT

A flow rate sensor comprises a fluid passage for a fluid to flow therealong; a main body structure arranged so as to turn its front end to the upstream side of the fluid and coaxially positioned within the fluid passage; and a detecting element disposed between the main body structure and the internal surface of the fluid passage. The main body structure is formed such that its cross section perpendicular to its central axis, at first becomes gradually larger from its front end towards its rear end and then becomes gradually smaller. The detecting element includes a ceramic substrate coated with a film made of a thermo-sensitive electrically resistant material. The film is formed into a meander pattern so as to form a flow rate detecting resistance. The detecting element further includes a fluid temperature compensating resistance.

20 Claims, 12 Drawing Sheets

FLOW RATE SENSOR

BACKGROUND OF THE INVENTION

1. Field of the Invention

The present invention relates to a flow rate sensor which is usually employed to measure an intake air flow rate in an internal combustion engine, particularly relates to a flow rate sensor which is used to measure the flow rate of a fluid on the basis of a heat transfer phenomenon where a heat is transferred either from a heating element or from a portion heated by the heating element to the fluid.

2. Description of the Related Art

Japanese Unexamined Patent Publication No.8-313318 has disclosed a thermo-sensitive type flow rate sensor which is used to measure the flow rate of a fluid flowing through a fluid passage, on the basis of a heat transfer phenomenon where a heat is transferred either from a heating element or from a portion heated by the heating element to the fluid.

FIG. 20 is a front view of the conventional thermo-sensitive type flow rate sensor disclosed in Japanese Unexamined Patent Publication No.8-313318. FIG. 21 is a cross sectional view of the thermo-sensitive type flow rate sensor of FIG. 20.

Referring to FIG. 21, an inner duct 22, which is used as a detecting pipe conduit and is formed with a bell mouth portion, is located within a fluid passage 6 through which a fluid (whose flow rate is to be measured) flows. The fluid flows from the left to the right in the drawing through the fluid passage 6, and a flow rate detecting element 20 is disposed within the inner duct 22.

The flow rate detecting element 20 is comprised of a ceramic substrate and a platinum layer formed by depositing platinum as served a thermo-sensitive electrically resistant material on the surface of the ceramic substrate. The thermo-sensitive electrically resistant material has a property whereby the electric resistance thereof will change with changes in temperature. Further, the platinum layer is formed into a meander pattern so as to serve as a flow rate detecting resistance 24. Moreover, a fluid temperature compensating resistance 21 is also made of a platinum which is a thermo-sensitive electrically resistant material, and is disposed upstream of the inner duct 22. A fluid rectifying means 23 is made of a resin and is formed into a honeycomb structure. Such fluid rectifying means 23 is positioned upstream of the fluid temperature compensating resistance 21.

An electronic circuit case 8 accommodating an electronic circuit board 7 is provided on the outside of the fluid passage 6. Mounted and fixed on the electric circuit board 7 is an electronic circuit for detecting the flow rate of a flowing fluid. In practice, the electronic circuit is electrically connected with both the flow rate detecting resistance 24 and the fluid temperature compensating resistance 21.

Referring now to FIG. 20, on one side of the circuit case 8 there is provided a connector 11 which is used to supply an electric power from the outside to the flow rate sensor, and to obtain a flow rate signal from the flow rate sensor so as to send the flow rate signal to a predetermined place outside the fluid passage 6.

In use of such conventional thermo-sensitive type flow rate sensor 25, an electric current flowing into the flow rate detecting resistance 24 of the flow rate detecting element 20, is controlled by the electronic circuit attached on the board 7, in a manner such that an average temperature of the flow rate detecting resistance 24 will rise to a predetermined value which is 200° C. higher than a fluid temperature detected by the fluid temperature compensating resistance 21. In more detail, when a flowing fluid quantity is small, an amount of heat transferred from the flow rate detecting resistance 24 to the flowing fluid will also be small, thus an electric current necessary for heating will decrease. On the other hand, when a flowing fluid quantity is large, an amount of heat transferred from the flow rate detecting resistance 24 to the flowing fluid will also be large, thus an electric current necessary for heating will be increased. Thus, in the thermo-sensitive type flow rate sensor 25, an electric current for heating is detected and used as a fluid rate signal, thereby detecting an actual flow rate of a fluid flowing through the passage 6 having a predetermined cross section area.

The thermo-sensitive type flow rate sensor 25, which is constructed in the above mentioned manner, is often used as an intake air flow rate sensor for an automobile engine, as shown in FIG. 22. Referring to FIG. 22, the flow rate sensor 25 is positioned within an intake air pipe 28 which is located downstream of an air cleaner element 27 enclosed in an air cleaner case 26. The air cleaner element 27 is a filter means made of a non-woven fabric or a filter paper, which is used to capture the dust entrained in the intake air so as to prevent it from entering the engine. Accordingly, after an automobile travels for a while, the air cleaner element 27 will get blocked due to the dust. As a result, there will be a change in the flow speed distribution of a fluid on the downstream side of the air cleaner element 27 before the fluid arrives at the flow rate sensor 25.

In fact, the flow rate detecting element 20 of the flow rate sensor 25 can detect only a part of the fluid flowing through the entire cross section of the fluid passage 6. Accordingly, although the total quantity of a fluid flowing through the passage 6 does not change, a change in the flow speed distribution of a fluid on the upstream side of the flow rate sensor 25, will bring about an error to a flow rate detecting result.

In order to solve the above problem, it has been suggested that a fluid rectifying means 23 be provided in the fluid passage 6 upstream of the flow rate sensor 25, as shown in FIGS. 20 and 21. To obtain a sufficient rectifying effect, such kind of fluid rectifying means 23 should be made so that the holes formed therethrough are quite small. However, since the fluid rectifying means 23 has a honeycomb structure and since such means is required to have a sufficient rigidity, it is difficult to manufacture the fluid rectifying means 23 with a small thickness. As a result, a finally obtained fluid rectifying means 23 has only a small aperture ratio (a small aperture area). Moreover, the use of such fluid rectifying means 23 will induce a lot of small eddy flows on the downstream side thereof, thus producing a large fluid flow resistance around the flow rate sensor 25. It is understood that if the fluid flow resistance on the flow rate sensor 25 is large, an amount of intake air to be supplied to an automobile engine will be small, resulting in a problem that the automobile engine can only produce a small output power.

Another conventional flow rate sensor has been disclosed in Japanese Unexamined Patent Publication No.7-71985. In order to obtain a sufficient fluid rectifying effect, this conventional flow rate sensor employs a fluid rectifying means combined a honeycomb structure made of a resin and a net-like grating structure. This however presents another problem, that is, a fluid flow resistance is caused not only due to the honeycomb structure but also due to the net-like grating structure.

On the other hand, in the conventional flow rate sensor 25 shown in FIGS. 20 and 21, the inner duct 22 is formed to have a bell mouth portion in order to obtain a uniform flow speed distribution. However, since a fluid cracking phenomenon will occur in an outer circumferential portion of the upstream end of the inner duct 22, there is also a large fluid flow resistance existing on the flow rate sensor 25.

A further example representing a conventional flow rate sensor is disclosed in Japanese Unexamined Patent Publication No.8-5430. According to this prior art, a central member having a by-pass structure is disposed in the fluid flow passage. Since such central member is provided with a complex by-pass structure, there are too many items and parts necessary to be installed in the fluid flow passage. Because such by-pass structure is prone to produce a fluid leakage, it is required that a particular attention be paid when assembling various items and parts into the fluid flow passage in order to prevent a possible leakage. This, however, results in a low productivity for the assembling operation.

SUMMARY OF THE INVENTION

In view of the above discussed problems associated with the above mentioned prior arts, it is an object of the present invention to provide an improved flow rate sensor capable of correctly detecting a flow rate even if there is a change in a flow speed distribution on the upstream side of the flow rate sensor.

Another object of the present invention is to provide an improved flow rate sensor having a simplified structure and thus causing only a small pressure loss (when measuring an air flow, there is only a small air flow resistance).

A further object of the present invention is to provide an improved flow rate sensor having a high precision and a good attachability, compact in size and thus capable of being installed in a flat fluid passage.

In order to achieve the above objects, according to one aspect of the present invention, there is provided an improved flow rate sensor comprising: a fluid passage for a fluid to flow therealong; a temperature sensing element for sensing the temperature of the fluid; a detecting element including a flow rate detecting resistance made of a thermo-sensitive electrically resistant material, the detecting element being disposed in the fluid passage so as to exposed the flow rate detecting resistance to the fluid flowing therethrough; and a control circuit for controlling an electric current flowing into the flow rate detecting resistance such that the temperature of the flow rate detecting resistance may be maintained at a predetermined value which is higher to some extent than a fluid temperature detected by the temperature sensing element. Here, the flow rate of the fluid flowing along the above fluid passage is measured on the basis of a heat transfer phenomenon from the above flow rate detecting resistance to the fluid. In particular, a main body structure is involved in the flow rate sensor, the main body structure is formed such that its cross section perpendicular to its central axis becomes larger from its front end towards its rear end. The main body structure is supported by a support section formed protrudingly on the internal surface of the fluid passage, and is positioned within the fluid passage so as to turn the front end of the main body structure to the upstream side of the fluid and so as to turn the rear end thereof to the downstream side of the fluid. The above detecting element is disposed between the main body structure and the internal surface of the fluid passage.

According to another aspect of the present invention, there is provided another improved flow rate sensor, comprising: a detecting pipe conduit adapted to be disposed in a fluid passage and suitable for a part of a fluid to flow therethrough; a temperature sensing element for sensing the temperature of the fluid; a detecting element including a flow rate detecting resistance made of a thermo-sensitive electrically resistant material, the detecting element being disposed in the fluid passage so as to exposed the flow rate detecting resistance to the fluid flowing therethrough; and a control circuit for controlling an electric current flowing into the flow rate detecting resistance such that the temperature of the flow rate detecting resistance may be maintained at a predetermined value which is higher to some extent than a fluid temperature detected by the temperature sensing element. Here, the flow rate of the fluid flowing along the above fluid passage is measured on the basis of a heat transfer phenomenon from the above flow rate detecting resistance to the fluid. In particular, a main body structure is involved in the flow rate sensor, the main body structure is formed such that its cross section perpendicular to its central axis becomes larger from its front end towards its rear end. The main body structure is supported by a support section formed protrudingly on the internal surface of the detecting pipe conduit, and is positioned within the detecting pipe conduit so as to turn the front end of the main body structure to the upstream side of the fluid and so as to turn the rear end thereof to the downstream side of the fluid. The above detecting element is disposed between the main body structure and the internal surface of the detecting pipe conduit.

DESCRIPTION OF THE PREFERRED EMBODIMENTS

Some preferred embodiments of the present invention will be described in detail below with reference to the accompanying drawings.

Embodiment 1

A first embodiment of the present invention will be described with reference to FIGS. 1–3.

Figure 1:
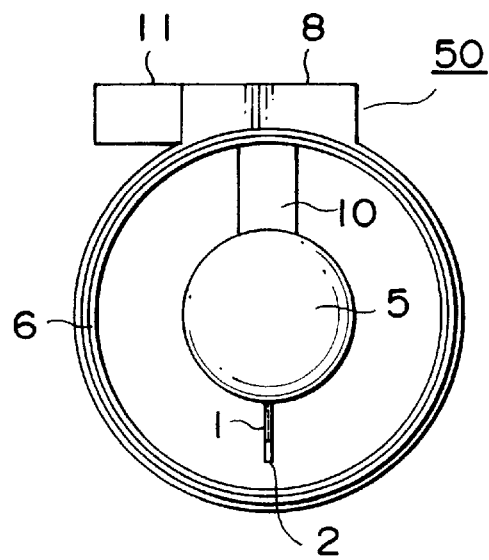
FIG. 1 is a front view illustrating a flow rate sensor made according to a first embodiment of the present invention.

FIG. 1 is a front view illustrating a flow rate sensor made according to the first embodiment of the present invention. FIG. 2 is a partially sectional side elevation illustrating the flow rate sensor of FIG. 1. FIG. 3 is a perspective view schematically illustrating a main body structure, a detecting element and a support section of the flow rate sensor of FIG. 2.

Figure 2:
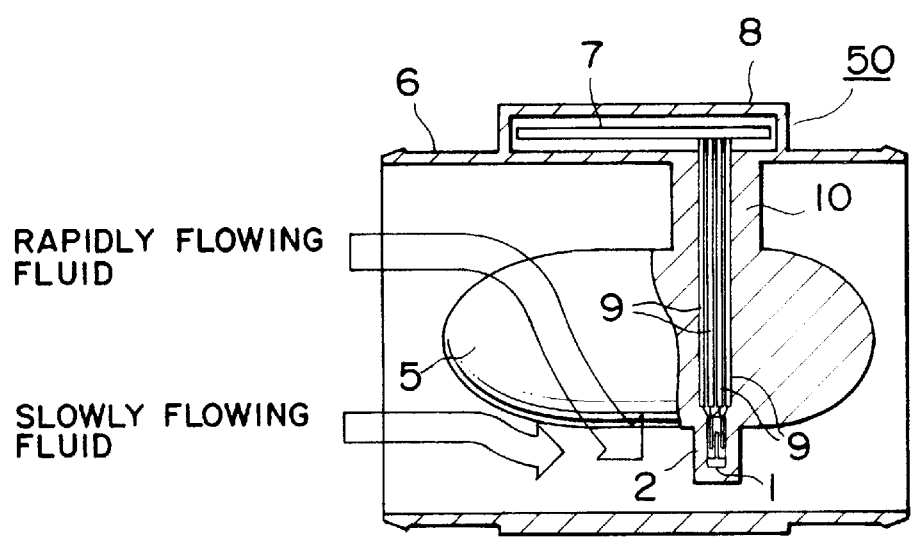
FIG. 2 is a partially sectional side elevation illustrating a flow rate sensor made according to the first embodiment of the present invention.

Referring to FIGS. 1 and 2, a fluid passage 6 is a pipe having circular cross section, a fluid (whose flow rate is to be measured) is allowed to flow from the left side to the right side in FIG. 2. A support section 10 is formed on the inner surface of the fluid passage 6, and a main body structure 5 is supported by the support section 10 within the fluid passage 6, such that it forms a coaxial relationship with the fluid passage 6. Such main body structure 5 has a circular cross section on a plane perpendicular to the central axis thereof and is formed into an obtuse head shape and into an obtuse tail shape. In detail, the circular cross section begins with a relatively small size on the upstream side and then gradually becomes larger towards the downstream side, finally again gradually becomes smaller. A detecting element 1 is disposed at a position which is located at the narrowest space between the outer surface of the main body structure 5 and the inner surface of the fluid passage 6. In more detail, the detecting element 1 is electrically connected through a plurality of lead members 9 to an electronic control circuit on a circuit board 7 enclosed in a circuit case 8. Further, the main body structure 5 is integrally connected and held by the support section 10 on a position where its circular cross section is the largest.

Figure 3:
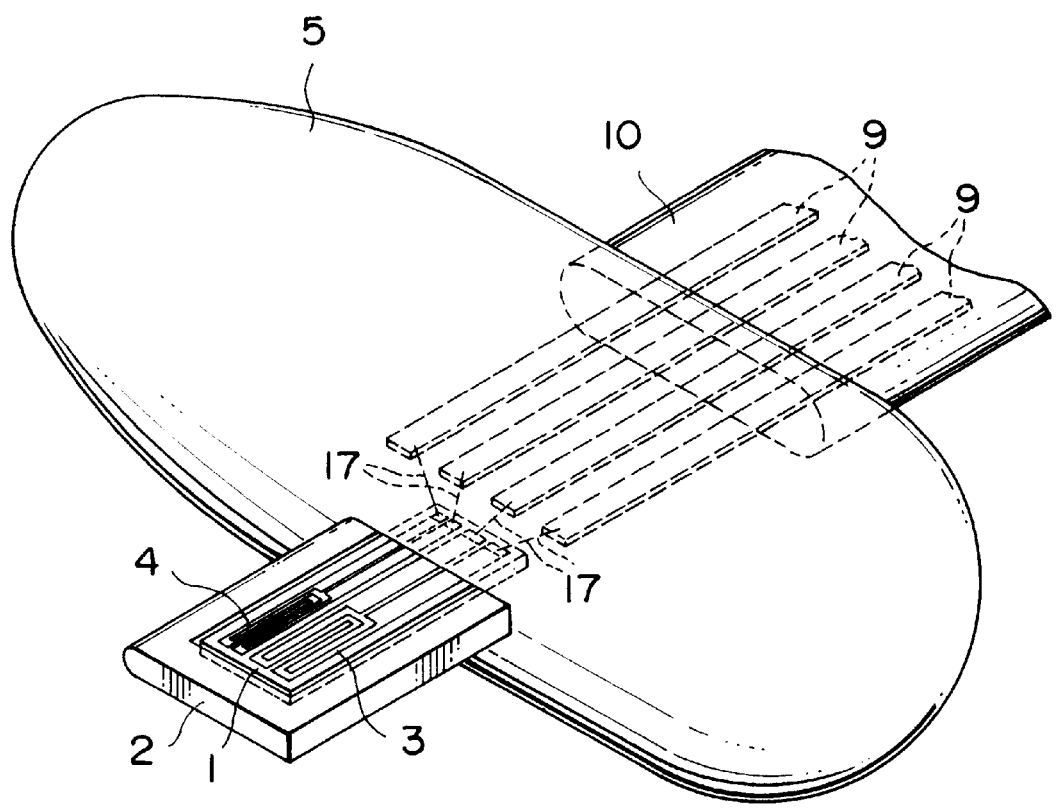
FIG. 3 is a perspective view illustrating an important part of the flow rate sensor made according to the first embodiment of the present invention.

Referring to FIG. 3, the detecting element 1 is comprised of a ceramic substrate and a platinum layer formed by depositing platinum as served a thermo-sensitive electrically resistant material on the surface of the ceramic substrate. The thermo-sensitive electrically resistant material has a property whereby the electric resistance thereof will change with changes in temperature. Further, the platinum film is formed into a meander pattern so as to form a flow rate detecting resistance 3 and a fluid temperature compensating resistance 4 (serving as a temperature sensing element). A plate member 2 is integrally connected with the main body structure 5 in such a manner that its main plane is coincident with a plane containing the central axis of the fluid passage 6. In practice, the detecting element 1 is fixed on the plate member 2 so that its outer surface is almost at the same level as the main plane of the plate member 2. One end of the detecting element 1 is fixedly buried in the main body structure 5. A plurality of lead members 9 are electrically connected to the flow rate detecting resistance 3 and the fluid temperature compensating resistance 4 through a plurality of lead wires 17 in the main body structure 5.

In particular, the flow rate detecting resistance 3 and the fluid temperature compensating resistance 4 are all formed on the surface of the ceramic substrate. Further, there is provided a thermally insulating means (not shown) to prevent a possible heat transfer from the flow rate detecting resistance 3 to the fluid temperature compensating resistance 4.

However, in the present embodiment and all the flowing embodiments which will be described in detail below, it is possible to dispense with the fluid temperature compensating resistance 4 as long as the flow rate detecting resistance 3 is provided on the detecting element 1. Further, the substrate of the detecting element 1 is not necessarily a ceramic substrate, it is also possible to employ a silicon substrate. Moreover, for use as the thermo-sensitive electrically resistant material, it is not necessarily to use a platinum, in fact it is also possible to use a nickel or a permalloy.

In this way, a thermo-sensitive type flow rate sensor 50 is formed which may be used to replace the conventional flow rate sensor 25 in the intake air pipe 28 for an automobile engine, so as to detect a flow rate of the intake air being supplied to the engine.

Figure 22:
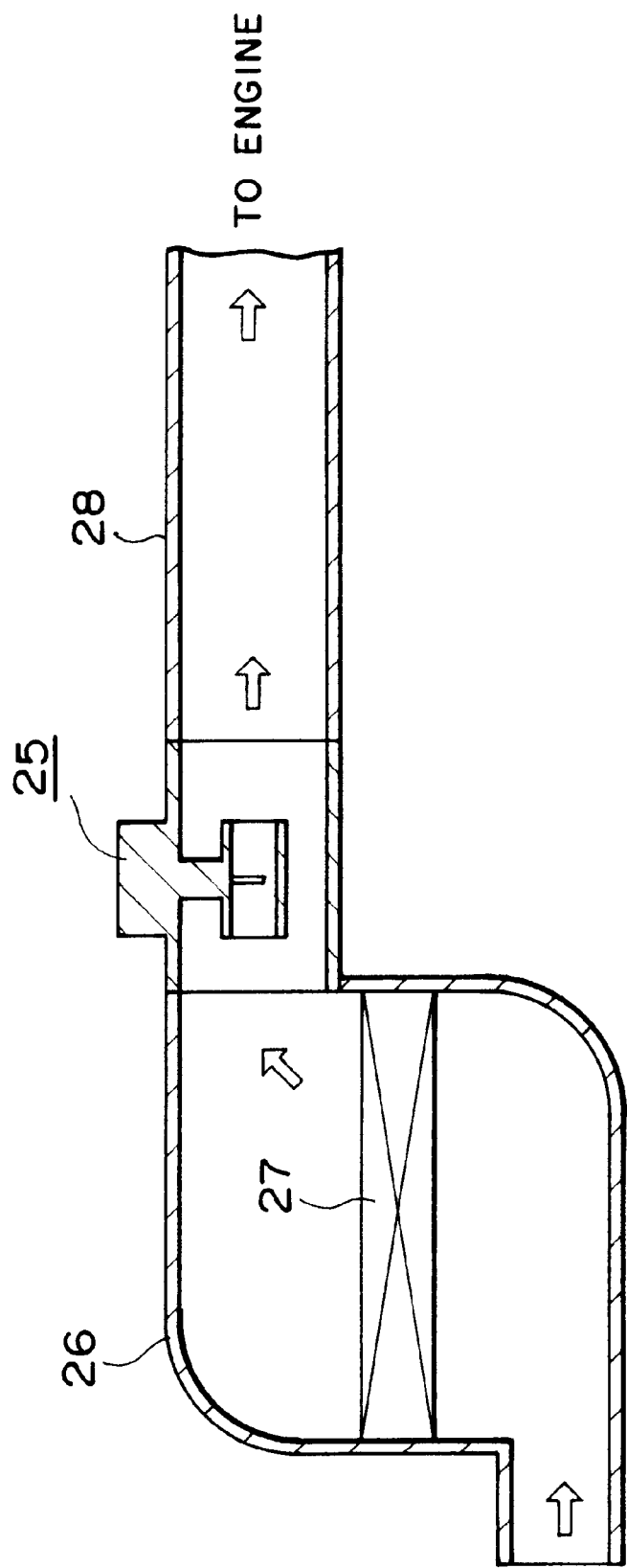
FIG. 22 is a sectional side elevation illustrating an intake pipe system for use with an automobile engine.

Usually, if the air cleaner element 27 (FIG. 22) is filled and blocked with the dust from a fluid flowing in the pipe, there will be a change in the flow speed distribution on the upstream side of the flow rate sensor 25 (FIG. 22). However, in the present embodiment shown in FIG. 2, when a fluid (an air flow) including different velocity portions is flowing along the passage 6, rapidly flowing fluid portions are caused to flow over the outer surface of the front end of the main body structure 5, thereby merging into the slowly flowing fluid portions. In this way, since the rapidly flowing fluid portions and the slowly flowing fluid portions are merged together, it is possible to obtain a uniform speed distribution for the fluid, ensuring that a fluid whose flow rate is to be measured will have a uniform speed distribution before arriving at the detecting element 1 of the flow rate sensor 50.

An electric current is supplied to the flow rate detecting resistance 3 of the detecting element 1 so as to produce a predetermined amount of heat. The heat from the flow rate detecting resistance 3 will be conducted by way of heat transfer to a fluid which has already arrived at the detecting element 1. The amount of heat being transferred from the resistance 3 to a fluid arriving at the detecting element 1 will become larger when there is an increase in the flow rate of the fluid. Thus, the temperature of the flow rate detecting resistance 3 will change along with a change in the amount of heat being transferred from the resistance 3 to the fluid.

The electric current flowing into the flow rate detecting resistance 3 is controlled by a control circuit mounted on the circuit board 7, in a manner such that an average temperature of the resistance 3 will rise to a predetermined value which is 200° C. higher than a fluid temperature detected by the fluid temperature compensating resistance 4. Therefore, by utilizing the electric current (for heating) as a flow rate signal, it is possible to detect the flow rate of a fluid flowing through the passage 6 having a predetermined cross section area.

In the flow rate sensor 50, the main body structure 5 has an obtuse front end which is disposed on the upstream side, the detecting element 1 is positioned at a position between the outer surface of the main body structure 5 and the inner surface of the fluid passage 6. Accordingly, even if a fluid flowing into the passage 6 has different velocity portions, these different velocity fluid portions will be rectified by the obtuse front end of the main body structure 5, so as to obtain a uniform speed distribution before arriving at the detecting element 1. In this manner, a drift of flow rate detecting result may be prohibited, thereby eliminating or at least inhibiting any possible detecting error.

Further, since the main body structure 5 is supported by the support section 10 on the downstream side of the above obtuse front end, the rapidly flowing fluid will merge into the slowly flowing fluid, so that the fluid as a whole will not be hampered in its movement by the support section 10, thereby effectively obtaining a uniform flow speed distribution for the flowing fluid.

Moreover, since the main body structure 5 forms a coaxial relationship with the fluid passage 6 and such main body structure 5 has a circular cross section on a plane perpendicular to the central axis thereof, and since the detecting element 1 is located at a position on the main body structure 5 corresponding to a largest cross section thereof, distances between the outer surface of the main body structure 5 and the inner surface of the fluid passage 6 are all the same so as to form an annular space having uniform thickness along the entire circumference thereof, and the fluid portions flowing through the annular space will be most rapidly accelerated near the detecting element 1, thereby effectively obtaining a uniform flow speed distribution for the flowing fluid.

Thus, with the use of the first embodiment of the present invention, when the same quantity of the fluid flows, it is possible to achieve a correct flow rate detection with only a minor error, no matter whether or not there is a change in the flow speed distribution of a fluid entering the passage 6.

Since the front end portion of the main body structure 5 has been formed into an obtuse head shape, different velocity fluid portions may be rectified with a high efficiency, thus the length of the main body structure 5 in the fluid flowing direction is allowed to be shortened, thereby making it possible to manufacture a flow rate sensor with a small size.

Further, with the use of the first embodiment of the present invention, it is allowed to dispense with a central member equipped with a complex by-pass structure, which is otherwise necessary for rectifying different velocity fluid portions in the above discussed prior arts. Therefore, the number of items and parts for forming a flow rate sensor are reduced, thus improving the productivity for manufacturing the same.

Figure 21:
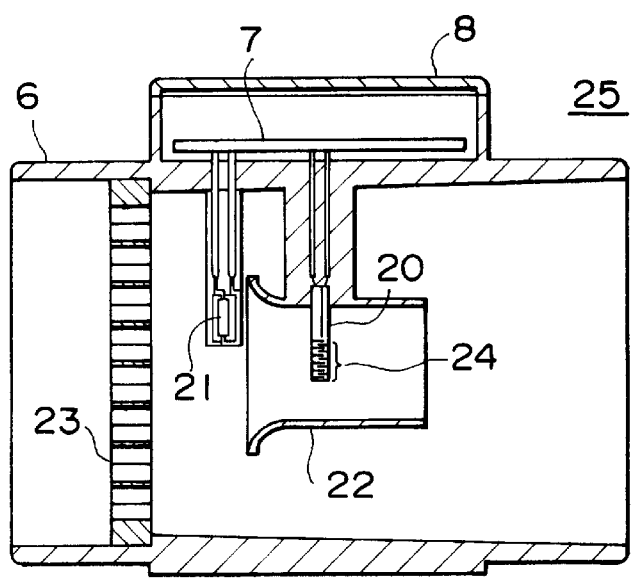
FIG. 21 is a sectional side elevation illustrating the flow rate sensor of FIG. 20.

Moreover, since the front end portion of the main body structure 5 has been formed into an obtuse head shape, the fluid flows over the outer surface of the obtuse front end of the main body structure 5 without cracking. Thus, when compared with the above-discussed conventional flow rate sensor 25 (FIG. 21) which involves the use of a detecting pipe conduit 22 having a bell mouth portion and also involves the use of a fluid rectifying means 23, there is only a small pressure loss in the flowing fluid in the present embodiment (with a prerequisite that both cases have the same flow rates and the same cross section areas of the fluid passage.

In addition, since the rear end portion (more exactly, a cross section area in a plane perpendicular to the central axis thereof) of the main body structure 5 becomes gradually smaller towards the downstream side of the flow rate sensor, it is also sure that the flowing fluid will not be cracked when flowing over the read end of the main body structure 5, thus ensuring a small pressure loss.

Accordingly, if the flow rate sensor 50 is disposed in the intake air pipe 28 (FIG. 22) for an engine of an automobile, an intake air being supplied to the engine will not be hampered, thereby enabling the engine to produce a high output power.

Preferably, the main body structure 5 is disposed within the fluid passage 6 in a manner such that the central axis of the main body structure 5 is completely coincident with that of the fluid passage 6. Nevertheless, a positional relationship between the main body structure 5 and the fluid passage 6 is not necessarily dependent upon the size of the flow rate sensor. In fact, the central axis of the main structure 5 is allowed to be inclined several degrees from that of the fluid passage 6, or alternatively, the central axis of the main body structure 5 is allowed to parallelly deviate several millimeters from that of the fluid passage 6, without bring any undesired influence to the effect of rectifying different velocity fluid portions.

Although it has been described in the present embodiment that the fluid passage 6 is a pipe having a circular cross section, it is also possible that such fluid passage 6 may be a pipe having an elliptical cross section or a rectangular cross section.

Further, although it has been described in this embodiment that the main body structure 5 has its cross section (in a plane perpendicular to the central axis thereof) formed into a circular shape, such cross section may also be elliptical or rectangular as long as the front end portion of the main body structure 5 is formed into an obtuse head.

Moreover, although it has been described in this embodiment that the support section 10 is formed to support the main body structure 5 at a position thereof where the cross section of the structure 5 has almost the largest area, it is also possible that the support section 10 may be so formed as to support the main body structure 5 at a position which is located on the downstream side of a position where the cross section of the structure 5 has almost the largest area.

Embodiment 2

A second embodiment of the present invention will be described with reference to FIGS. 4 and 5.

Figure 4:
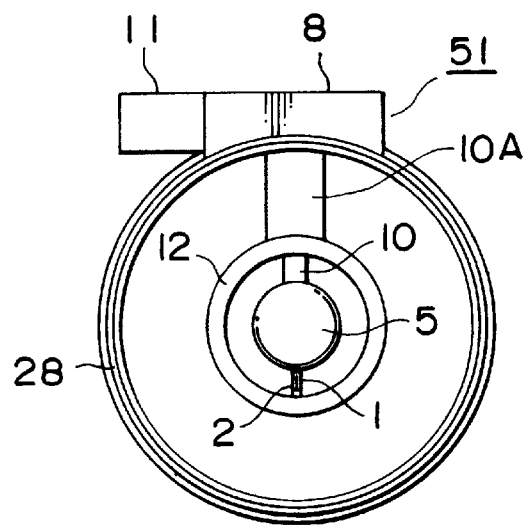
FIG. 4 is a front view illustrating a flow rate sensor made according to a second embodiment of the present invention.

FIG. 4 is a front view illustrating a flow rate sensor made according to the second embodiment. FIG. 5 is a sectional side elevation illustrating the flow rate sensor of FIG. 4.

Figure 5:
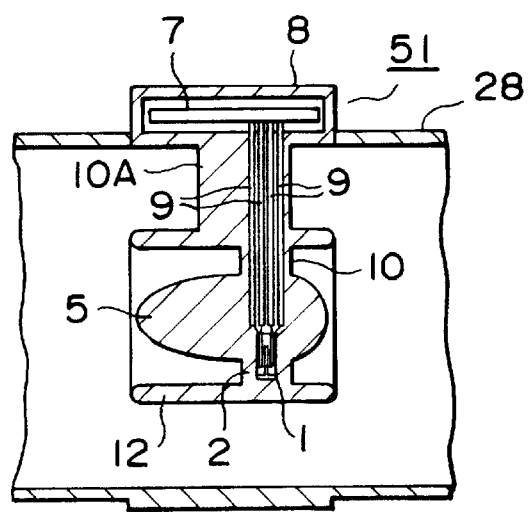
FIG. 5 is a sectional side elevation illustrating a flow rate sensor made according to the second embodiment of the present invention.

Referring to FIGS. 4 and 5, a thermo-sensitive type flow rate sensor 51 of the second embodiment has a main body structure 5 supported by a support section 10 in a manner such that the main body structure 5 may be coaxially disposed within a detecting pipe conduit 12 made of a pipe having circular cross section. A circuit case 8 is provided on one end of the support section 10A extending from the outer surface of the detecting pipe conduit 12. Other elements in the second embodiment have the same structure and thus the same functions as those in the first embodiment.

The flow rate sensor 51 having a structure as discussed above, may be airtightly disposed in the intake air pipe 28 (FIG. 22) for an engine of an automobile, with the detecting pipe conduit 12 located at a proper position in the intake air pipe 28, thereby detecting the flow rate of an intake air being supplied to the automobile engine.

With the use of the flow rate sensor 51 of the present embodiment, when there is a change in a flow speed distribution of a fluid flowing into the detecting pipe conduit 12, the different velocity fluid portions will be rectified by virtue of the main body structure 5 (having the same structure as that in the first embodiment) so as to obtain a uniform flow speed distribution for the fluid flowing therethrough, thereby reducing detecting errors in detection results produced by the flow rate sensor 51.

Although the flow rate sensor 51 of the second embodiment is effective for rectifying different velocity portions of a fluid entering the detecting pipe conduit 12, it fails to rectify different velocity portions of the entire fluid flowing in the intake air pipe 28. Namely, since the flow rate sensor 51 of the second embodiment fails to rectify the fluid portions flowing along the outside of the detecting pipe conduit 12, it is difficult to produce a fluid rectifying effect as satisfactory as the above first embodiment in which the flow rate sensor 50 can rectify different velocity portions of the entire fluid flowing through the fluid passage 6.

On the other hand, the flow rate sensor 51 may be arranged with its detecting pipe conduit 12 being optionally located at any position within the intake air pipe 28. Thus, if the intake air pipe 28 has a rectangular cross section, or if the intake air pipe 28 involves a bent portion, or if the intake air pipe 28 includes different pipe portions having different diameters, the detecting pipe conduit 12 of the sensor 51 is allowed to be inserted in a position (for instance, a center area of the intake air pipe 28) where the sensor 51 will receive only little influence from different velocity fluid portions, ensuring that different velocity portions of a fluid entering the detecting pipe conduit 12 may be effectively rectified.

Further, since the cross section area of the intake air pipe 28 is occupied to a considerable extent by the detecting pipe conduit 12, it is possible to minimize a detecting error in a detection result produced by the flow rate sensor 51, irrespective of a not uniform speed distribution (or a change in such distribution) of a fluid flowing through the intake air pipe 28.

Moreover, since the detecting pipe conduit 12 of the flow rate sensor 51 is relatively short in its longitudinal direction, the sensor 51 itself is allowed to be made compact in size.

Therefore, the flow rate sensor 51 of the second embodiment of the present invention is suitable for use as a plug-in type flow rate sensor.

In addition, the detecting pipe conduit 12 of the flow rate sensor 51 may be used as a probing means for detecting a flowing speed of a fluid. Thus, the flow rate sensor 51 made according to the second embodiment of the present invention, is possible to measure the flowing speed of a fluid at any position in a three dimensional space, thereby rendering it suitable for many measurement applications.

Embodiment 3

A third embodiment of the present invention will be described with reference to FIGS. 6 and 7.

Figure 6:
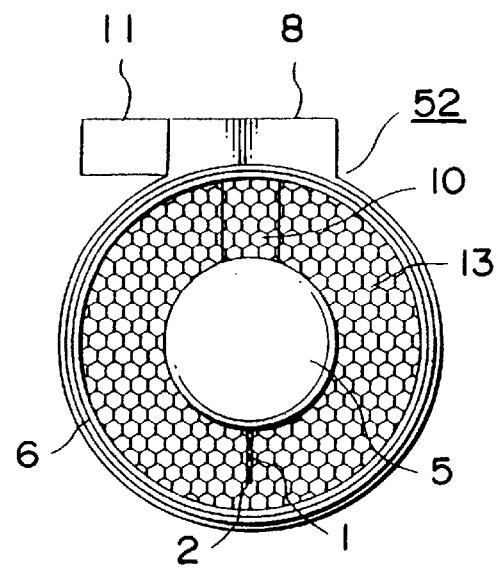
FIG. 6 is a front view illustrating a flow rate sensor made according to a third embodiment of the present invention.

FIG. 6 is a front view illustrating a flow rate sensor made according to the third embodiment. FIG. 7 is a sectional side elevation illustrating the flow rate sensor of FIG. 6.

Figure 7:
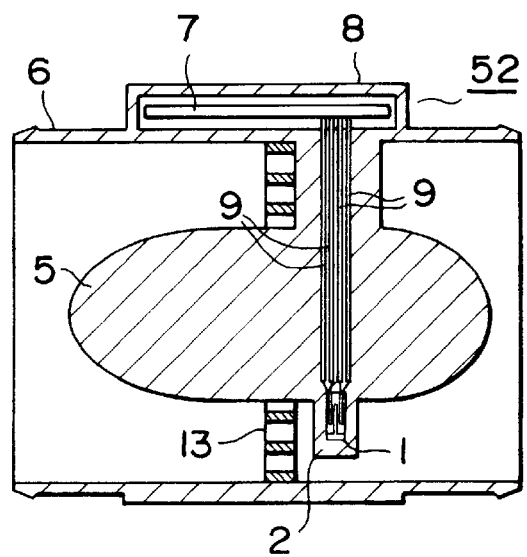
FIG. 7 is a sectional side elevation illustrating a flow rate sensor made according to the third embodiment of the present invention.

Referring to FIGS. 6 and 7, a thermo-sensitive type flow rate sensor 52 of the third embodiment is almost the same as that of the above first embodiment except the following differences. Namely, a fluid rectifying means 13 having a honeycomb structure for rectifying a flowing direction of a fluid, is disposed downstream of the front end of a main body structure 5, but upstream of the detecting element 1.

In use of the flow rate sensor 52, when a fluid including different velocity portions is approaching the sensor 52, the rapidly flowing fluid portions will flow diagonally over the curved outer surface of the main body structure 5 so as to merge into the slowly flowing fluid portions, thereby producing a uniform flow speed distribution. When the rapidly flowing fluid portions flow over the outer surface of the main body structure 5 and merge into the slowly flowing fluid portions, the entire fluid will be deflected in its flowing direction. However, this kind of fluid deflection will be corrected by virtue of the fluid rectifying means 13, so that the fluid is directed to become parallel with the axial direction of the passage 6 before arriving at the detecting element 1. In this way, since the direction of a fluid flowing over the detecting element 1 is constantly rectified, the fluid around the element 1 is stabilized.

Therefore, with the use of the flow rate sensor 52 made according to the second embodiment of the present invention, it is possible not only to obtain the same effect as in the first embodiment, but also to obtain another effect of further reducing a detecting error in a detection result of the sensor 52 by rectifying the flowing direction of a fluid flowing through the passage 6 (using the fluid rectifying means 13).

Although it has been described in the third embodiment that a fluid rectifying means 13 is combined with the flow rate sensor 50 of the first embodiment, it is also possible that such fluid rectifying means 13 may be combined with the flow rate sensor 51 of the second embodiment, thereby obtaining the same effect.

Embodiment 4

A fourth embodiment of the present invention will be described with reference to FIGS. 8 and 9.

Figure 8:
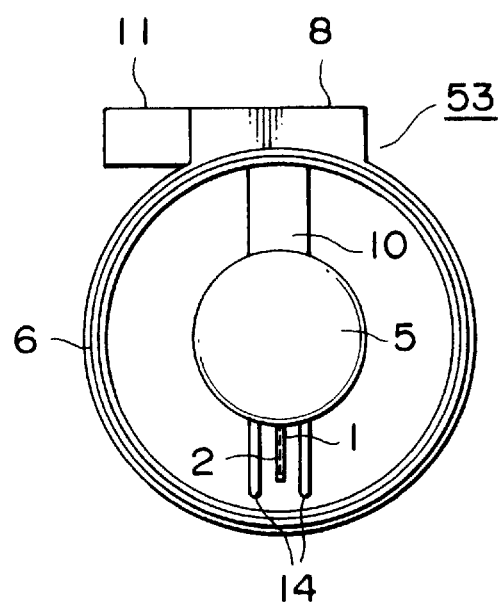
FIG. 8 is a front view illustrating a flow rate sensor made according to a fourth embodiment of the present invention.

FIG. 8 is a front view illustrating a flow rate sensor made according to the fourth embodiment. FIG. 9 is a sectional side elevation illustrating the flow rate sensor of FIG. 8.

Figure 9:
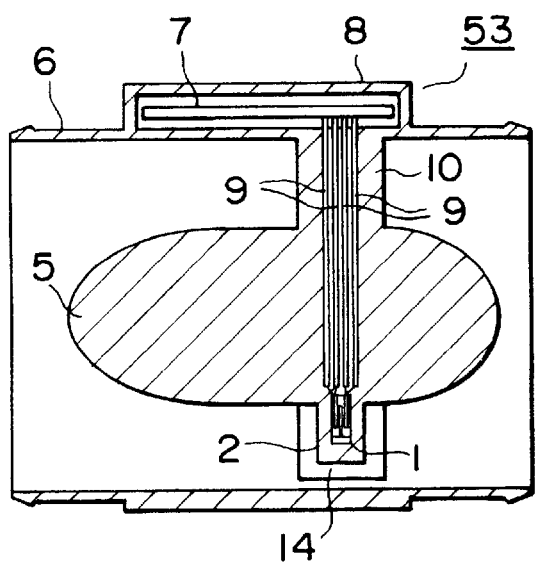
FIG. 9 is a sectional side elevation illustrating a flow rate sensor made according to the fourth embodiment of the present invention.

Referring to FIGS. 8 and 9, a thermo-sensitive type flow rate sensor 53 of the fourth embodiment is almost the same as that of the above first embodiment except the following differences. Namely, a pair of fluid rectifying members 14 are mutually parallelly disposed in a manner such that they are facing each other with a detecting element 1 interposed therebetween (when viewed in the longitudinal direction of a fluid passage 6).

In use of the flow rate sensor 53, when a fluid including different velocity portions is approaching the sensor 53, the rapidly flowing fluid portions will flow diagonally over the outer surface of the main body structure 5 so as to merge into the slowly flowing fluid portions, thereby producing a uniform flow speed distribution. When the rapidly flowing fluid portions flow over the outer surface of the main body structure 5 and merge into the slowly flowing fluid portions, the entire fluid will be deflected in its flowing direction. However, this kind of fluid deflection will be corrected by virtue of the fluid rectifying members 14, so that the fluid will be directed to become parallel with the axial direction of the passage 6 before arriving at the detecting element 1. In this way, since the direction of a fluid flowing over the detecting element 1 is constantly rectified, the fluid around the element 1 is stabilized.

Therefore, with the use of the flow rate sensor 53 made according to the fourth embodiment of the present invention, it is possible not only to obtain the same effect as in the first embodiment, but also to obtain another effect of further reducing a detecting error in a detection result of the sensor 53 by rectifying the flowing direction of a fluid flowing through the passage 6 (using the pair of fluid rectifying members 14).

Further, since the pair of fluid rectifying members 14 are disposed between the outer surface of the main body structure 5 and the inner surface of the fluid passage 6, in a position where the detecting element 1 is located, a pressure loss will be less than that in the third embodiment.

Although it has been described in the fourth embodiment that a pair of fluid rectifying members 14 are combined with the flow rate sensor 50 of the first embodiment, it is also possible that such fluid rectifying members 14 may be combined with the flow rate sensor 51 of the second embodiment, thereby obtaining the same effect.

Embodiment 5

A fifth embodiment of the present invention will be described with reference to FIGS. 10 and 11.

Figure 10:
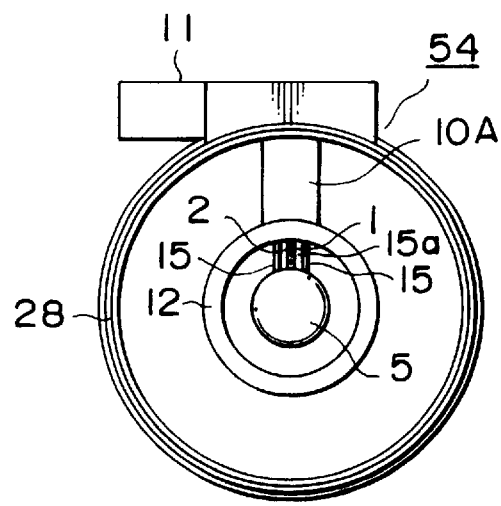
FIG. 10 is a front view illustrating a flow rate sensor made according to a fifth embodiment of the present invention.

FIG. 10 is a front view illustrating a flow rate sensor made according to the fifth embodiment. FIG. 11 is a sectional side elevation illustrating the flow rate sensor of FIG. 10.

Figure 11:
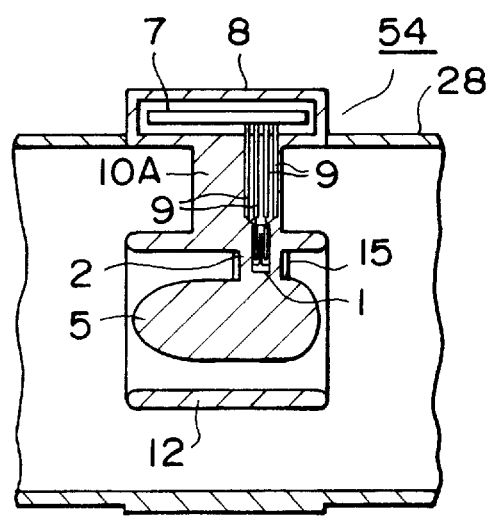
FIG. 11 is a sectional side elevation illustrating a flow rate sensor made according to the fifth embodiment of the present invention.

Referring to FIGS. 10 and 11, a thermo-sensitive type flow rate sensor 54 of the fifth embodiment is almost the same as that of the above second embodiment except the following differences. Namely, a support section 15 for supporting a main body structure 5 has a fluid path 15a formed through the section 15 in the fluid flowing direction (a direction along the central axis of the detecting pipe conduit 12). A detecting element 1 is disposed within the fluid path 15a of the support section 15.

In use of the flow rate sensor 54, when a fluid including different velocity portions is flowing into the detecting pipe conduit 12, the rapidly flowing fluid portions will flow diagonally over the outer surface of the main body structure 5 so as to merge into the slowly flowing fluid portions, thereby producing a uniform flow speed distribution. When the rapidly flowing fluid portions flow over the outer surface of the main structure 5 and merge into the slowly flowing fluid portions, the entire fluid will be deflected in its flowing direction. However, this kind of fluid deflection will be corrected by virtue of the support section 15, so that the fluid will be directed to become parallel with the axial direction of the passage 6 before arriving at the detecting element 1. In this way, since the direction of a fluid flowing over the detecting element 1 is constantly rectified, the fluid around the element 1 is stabilized.

Therefore, with the use of the flow rate sensor 54 according to the fifth embodiment of the present invention, it is possible not only to obtain the same effect as in the second embodiment, but also to obtain another effect of further reducing a detecting error in a detection result of the sensor 54 by rectifying the direction of a fluid flowing through the detecting pipe conduit 12 (using the specific structure of the support section 15).

Further, since the support section 15 serves to support the main body structure 5 and at the same time to act as a fluid rectifying means, and since the support section 15 itself is located between the outer surface of the main body structure 5 and the inner surface of the detecting pipe conduit 12 and only in a position where the detecting element 1 is located, a pressure loss will be controlled at a small value.

Embodiment 6

A sixth embodiment of the present invention will be described with reference to FIGS. 12 and 13.

Figure 12:
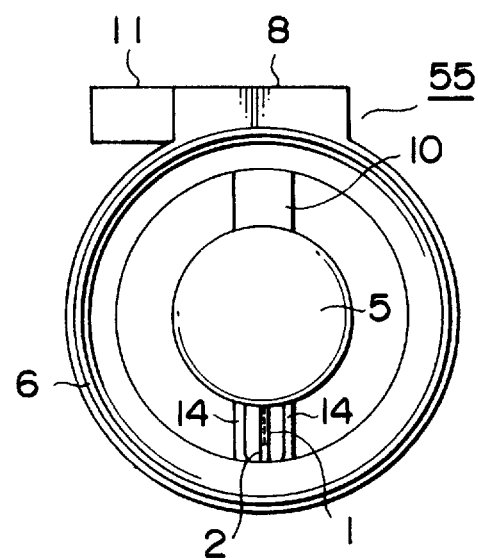
FIG. 12 is a front view illustrating a flow rate sensor made according to a sixth embodiment of the present invention.

FIG. 12 is a front view illustrating a flow rate sensor made according to the sixth embodiment. FIG. 13 is a sectional side elevation illustrating the flow rate sensor of FIG. 12.

Figure 13:
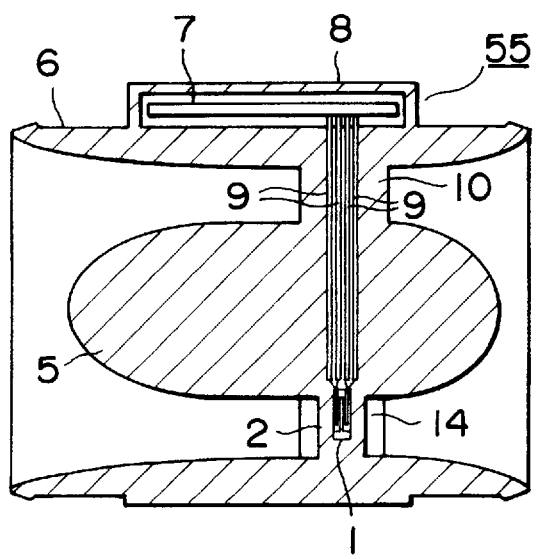
FIG. 13 is a sectional side elevation illustrating a flow rate sensor made according to the sixth embodiment of the present invention.

Referring to FIGS. 12 and 13, a thermo-sensitive type flow rate sensor 55 of the sixth embodiment is almost the same as that of the above fourth embodiment except the following differences. Namely, in an area within the fluid passage 6 where the main body structure 5 of the sensor 55 is located, the inner diameter of the fluid passage 6 becomes gradually smaller from the upstream side towards the downstream side, and then becomes gradually larger again. The detecting element 1 is disposed in a position on the main body structure 5 where the fluid passage 6 has its smallest inner diameter (i.e., a fluid flowing cross section is the narrowest).

Therefore, with the use of the flow rate sensor 55 made according to the sixth embodiment of the present invention, it is possible not only to obtain the same effect as in the fourth embodiment, but also to obtain another effect of further enhancing the fluid rectification by increasing a contracted flow (making use of a structure where fluid cracking is not easy to occur).

Although it has been described in the sixth embodiment that the inner diameter of the fluid passage 6 (similar to that in the fourth embodiment) becomes gradually smaller from the upstream side towards the downstream side and then becomes gradually larger again, it is also possible that the inner diameter of a detecting pipe conduit 12 (similar to that in the second embodiment) becomes gradually smaller from the upstream side towards the downstream side and then becomes gradually larger again, thereby obtaining the same effect.

Embodiment 7

A seventh embodiment of the present invention will be described with reference to FIGS. 14 and 15.

Figure 14:
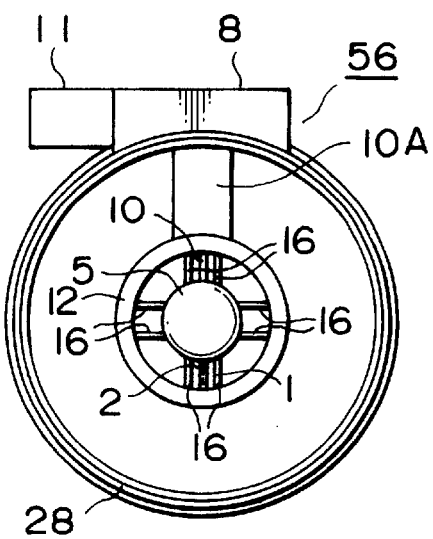
FIG. 14 is a front view illustrating a flow rate sensor made according to a seventh embodiment of the present invention.

FIG. 14 is a front view illustrating a flow rate sensor made according to the seventh embodiment. FIG. 15 is a sectional side elevation illustrating the flow rate sensor of FIG. 14.

Figure 15:
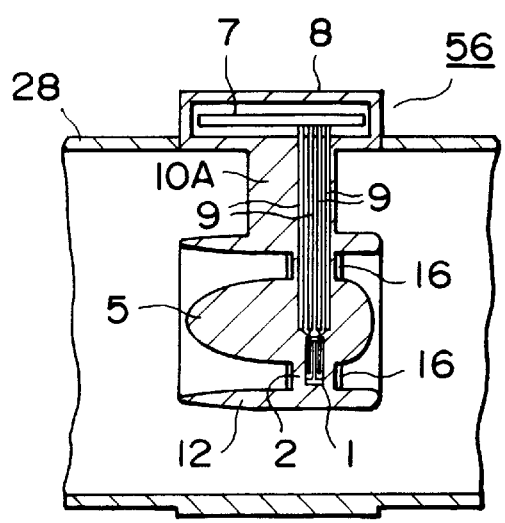
FIG. 15 is a sectional side elevation illustrating a flow rate sensor made according to the seventh embodiment of the present invention.

Referring to FIGS. 14 and 15, a thermo-sensitive type flow rate sensor 56 of the seventh embodiment is almost the same as that of the above second embodiment except the following differences. Namely, the main body structure 5 is supported not only by a support section 10, but also by four pairs of support members 16. The four pairs of support members 16 are arranged in a manner such that their main surface are orthogonal to a plane which is perpendicular to the central axis of the detecting pipe conduit 12. In particular, the four pairs of the support members 16 are equivalently arranged on the outer circumference of the main body structure 5 at an angular interval of 90 degrees. As shown in FIG. 14, one pair of support members 16 are arranged to have a detecting element 1 interposed therebetween, while another pair of support members 16 are arranged to have the support section 10 interposed therebetween.

In use of the flow rate sensor 56, when a fluid including different velocity portions is flowing into the detecting pipe conduit 12, the rapidly flowing fluid portions will flow over the outer surface of the main body structure 5 so as to merge into the slowly flowing fluid portions, thereby producing a uniform flow speed distribution. When the rapidly flowing fluid portions flow over the outer surface of the main body structure 5 and merge into the slowly flowing fluid portions, the entire fluid will be deflected in its flowing direction. However, this kind of fluid deflection will be corrected by virtue of the support members 16, so that the fluid will be directed to become parallel with the axial direction of the passage 6 before arriving at the detecting element 1. Further, since the four pairs of the support members 16 are equivalently arranged on the outer circumference of the main body structure 5, a pressure loss occurring between the detecting pipe conduit 12 and the main body structure 5 will become uniform in the circumferential direction without any deflection.

Therefore, with the use of the flow rate sensor 56 made according to the seventh embodiment of the present invention, it is possible not only to obtain the same effect as in the second embodiment, but also to obtain a further effect of ensuring a more satisfactory fluid rectification due to a fact that a pressure loss occurring between the detecting pipe conduit 12 and the main body structure 5 is uniform in the circumferential direction.

Although it has been described in the seventh embodiment that four pairs of the support members 16 are equivalently arranged on the outer circumference of the main body structure 5 at an angular interval of 90 degrees, it is also possible that three or five pairs of such support members 16 are provided so that they are equivalently arranged on the outer circumference of the main body structure 5 at an angular interval larger or smaller than 90 degrees. Further, as long as at least two support members 16 are formed into one pair to have the detecting element 1 interposed therebetween, other support members 16 do not necessarily have to be formed in pairs. Moreover, one pair of support members 16 having a detecting element 1 interposed therebetween, are allowed to be made into a shape which is different from other support members 16.

Although it has been described in the seventh embodiment that the main body structure 5 is supported by four pairs of support members 16 based upon a flow rate sensor 51 of the second embodiment, it is also possible that the main body portion 5 may be supported by four pairs of support members 16 based upon a flow rate sensor 50 of the first embodiment, thereby obtaining the same effect.

Embodiment 8

An eighth embodiment of the present invention will be described with reference to FIGS. 16 and 17.

Figure 16:
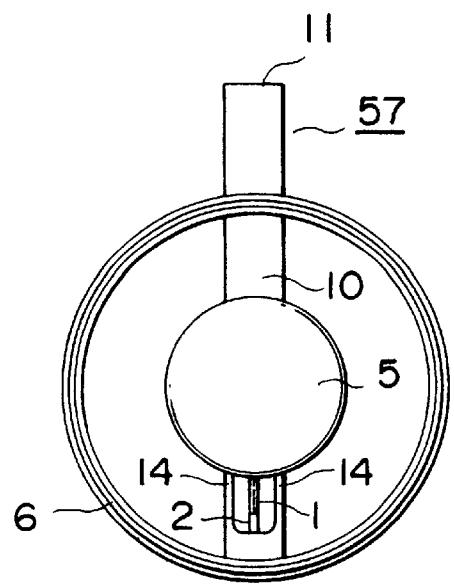
FIG. 16 is a front view illustrating a flow rate sensor made according to a eighth embodiment of the present invention.

FIG. 16 is a front view illustrating a flow rate sensor made according to the eighth embodiment. FIG. 17 is a sectional side elevation illustrating the flow rate sensor of FIG. 16.

Figure 17:
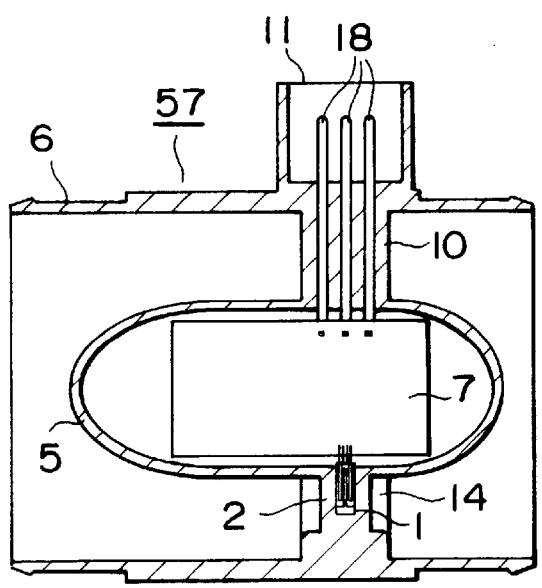
FIG. 17 is a sectional side elevation illustrating a flow rate sensor made according to the eighth embodiment of the present invention.

Referring to FIGS. 16 and 17, a thermo-sensitive type flow rate sensor 57 of the eighth embodiment is almost the same as that of the above fourth embodiment except the following differences. Namely, a circuit board 7 mounting a control circuit and a detecting circuit are enclosed within the main body structure 5. A detecting element 1 is connected to the circuit board 7 through a plurality of lead wires 17 (FIG. 3). A plurality of terminals 18 of a connector 11 for feeding electric signals to the circuit board 7 and for obtaining electric signals therefrom, are electrically connected to the circuit board 7 through the internal area of a support section 10.

Therefore, with the use of the flow rate sensor 57 made according to the eighth embodiment of the present invention, it is possible not only to obtain the same effect as in the fourth embodiment, but also to obtain a further effect of ensuring a more compact size for a flow rate sensor due to a fact that a circuit case does not appear on the outer surface of a fluid passage 6. When the flow rate sensor 57 of the eighth embodiment is to be attached to an automobile engine, such attachment operation may be made easy even in a narrow engine room (since a compact size of the flow rate sensor 57 allows a large freedom in attachment operation).

Embodiment 9

An ninth embodiment of the present invention will be described with reference to FIGS. 18 and 19.

Figure 18:
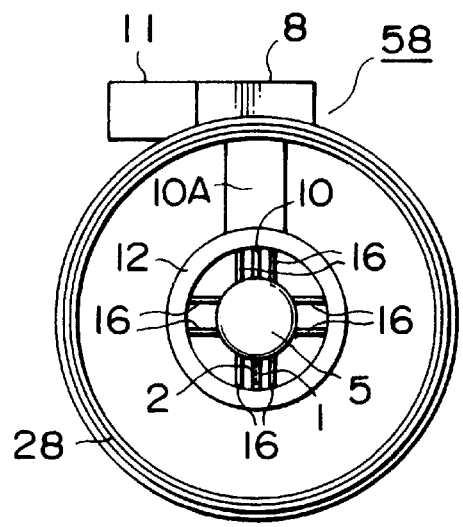
FIG. 18 is a front view illustrating a flow rate sensor made according to a ninth embodiment of the present invention.

FIG. 18 is a front view illustrating a flow rate sensor made according to the ninth embodiment. FIG. 19 is a sectional side elevation illustrating the flow rate sensor of FIG. 18.

Figure 19:
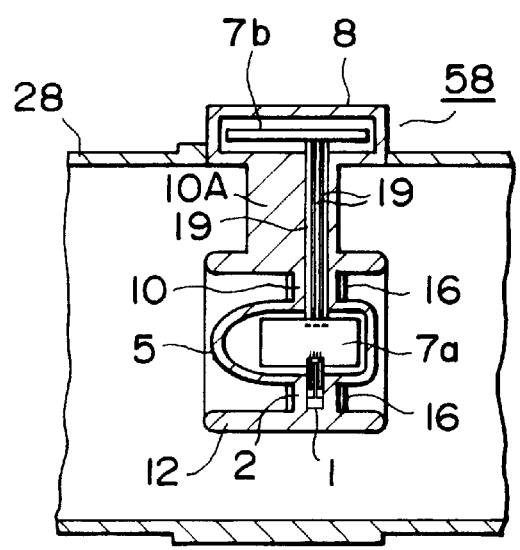
FIG. 19 is a sectional side elevation illustrating a flow rate sensor made according to the ninth embodiment of the present invention.
Figure 20:
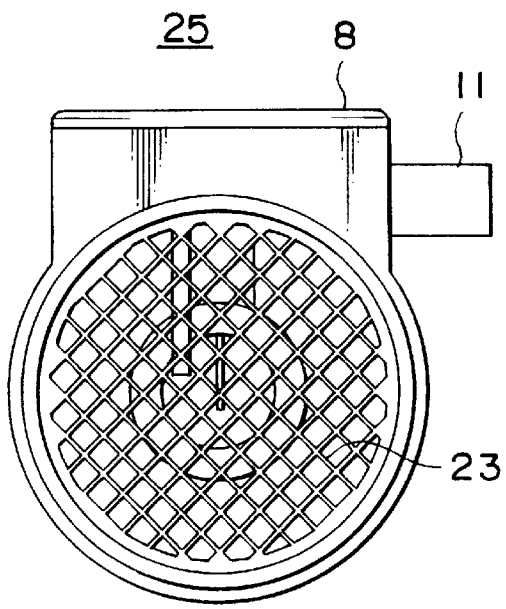
FIG. 20 is a front view illustrating a flow rate sensor made according to a prior art.

Referring to FIGS. 18 and 19, a thermo-sensitive type flow rate sensor 58 of the ninth embodiment is almost the same as that of the above seventh embodiment except the following differences. Namely, a control circuit or a detecting circuit, or a part of the control circuit and a part of the detecting circuit are mounted and fixed on a first circuit board 7a which is then enclosed into the internal area of a main body structure 5. Other circuits are mounted and fixed on the second circuit board 7b which is then housed in a circuit case 8. A detecting element 1 is connected to the first circuit board 7a through a plurality of lead wires. The first circuit board 7a and the second circuit board 7b are connected to each other through a plurality of lead members 19. Further, although not shown in the drawings, the second circuit board 7b is electrically connected with terminals of the connector 11. The control circuit comprises the first circuit board 7a and the second circuit board 7b.

Therefore, with the use of the flow rate sensor 58 made according to the ninth embodiment of the present invention, it is possible not only to obtain the same effect as in the seventh embodiment, but also to obtain a further effect of ensuring a compact size for a flow rate sensor by reducing the size of the circuit case 8 formed on the outer surface of the intake air pipe 28.

Although it has been described in the above embodiments that an electric current flowing into the flow rate detecting resistance 3 is used as a flow rate signal so as to detect the flow rate of a fluid flowing through a fluid passage 6 or through an intake air pipe 28, the present invention is not limited to a flow rate sensor where an electric current (for heating) is used as a flow rate signal. In fact, the present invention may also be a flow rate sensor capable of detecting the flow rate of a fluid in accordance with a heat transfer from a flow rate detecting resistance 3 to a fluid whose flow rate is to be measured. For example, a heater resistance consisting of a thermo-sensitive resistance to which an electric current is supplied, may be provided on the substrate of a detecting element 1. Further, a pair of temperature sensors consisting of a thermo-sensitive resistance are disposed upstream and downstream of the heater resistance. A flow rate sensor having a structure as the above, namely, a temperature difference type flow rate sensor may detect a flow rate in accordance with a temperature difference between the two temperature sensors. The present invention may also be such temperature difference type flow rate sensor.

With the use of the present invention which has been constituted in the above-described manner, it is possible to provide at least the following effects.

According to the present invention, an improved flow rate sensor having a fluid passage for a fluid to flow therealong; a temperature sensing element for sensing the temperature of the fluid; a detecting element including a flow rate detecting resistance made of a thermo-sensitive electrically resistant material, the detecting element being disposed in the fluid passage so as to exposed the flow rate detecting resistance to the fluid flowing therethrough; and a control circuit for controlling an electric current flowing to the flow rate detecting resistance such that the temperature of the flow rate detecting resistance may be maintained at a predetermined value which is higher to some extent than a fluid temperature detected by the temperature sensing element. Here, the flow rate of the fluid flowing along the above fluid passage is measured on the basis of the heat transfer phenomenon from the above flow rate detecting resistance to the fluid. In particular, a main body structure is included in the flow rate sensor, the main body structure is formed such that its cross section perpendicular to its central axis becomes larger from its front end towards its rear end. The main body structure is supported by a support section formed protrudingly on the internal surface of the fluid passage, and is positioned within the flow passage so as to turn the front end of the main body structure to the upstream side of the fluid and so as to turn the rear end thereof to the downstream side of the fluid. The above detecting element is disposed between the main body structure and the internal surface of the fluid passage. Therefore, even if there is a change in the speed distribution of a fluid whose flow rate is to be measured, it is still possible to perform a correct flow rate detection with a high precision and a low pressure loss.

Further, another improved flow rate sensor comprises a detecting pipe conduit adapted to be disposed in a fluid passage and suitable for a part of a fluid to flow therethrough; a temperature sensing element for sensing the temperature of the fluid; a detecting element including a flow rate detecting resistance made of a thermo-sensitive electrically resistant material, the detecting element being disposed in the detecting pipe conduit so as to exposed the flow rate detecting resistance to the fluid flowing therethrough; and a control circuit for controlling an electric current flowing to the flow rate detecting resistance such that the temperature of the flow rate detecting resistance may be maintained at a predetermined value which is higher to some extent than a fluid temperature detected by the temperature sensing element. Here, the flow rate of the fluid flowing along the above fluid passage is measured on the basis of the heat transfer phenomenon from the above flow rate detecting resistance to the fluid. In particular, a main body structure is involved in the flow rate sensor, the main body structure is formed such that its cross section perpendicular to its central axis becomes larger from its front end towards its rear end. The main body structure is supported by a support section formed protrudingly on the internal surface of the detecting pipe conduit, and is positioned within the detecting pipe conduit so as to turn the front end of the main body structure to the upstream side of the fluid and so as to turn the rear end thereof to the downstream side of the fluid. The above detecting element is disposed between the main body structure and the internal surface of the detecting pipe conduit. Therefore, the flow rate sensor may be disposed into a flat fluid passage to perform a correct flow rate detection without being affected by a change in the speed distribution of a fluid flowing therethrough. Moreover, such flow rate sensor can be used to measure the flow rate of a flowing fluid at any position in a three dimensional space.

Further, the front end portion of the main body structure is formed into an obtuse head shape, in a manner such that its cross section area becomes gradually larger from its front end towards its rear end. Therefore, it is possible to obtain a high fluid rectifying effect, inhibit a fluid cracking around the front end of the main body structure, reduce a pressure loss.

Further, the detecting element is disposed in an area within the fluid passage or the detecting pipe conduit where a space formed between the outer surface of the main body structure and the internal surface of the fluid passage or the detecting pipe conduit is the narrowest. Therefore, the detecting element is positioned in an area where a fluid has the most uniform speed distribution, thereby permitting a flow rate detection with a high precision.

Further, the fluid passage or the detecting pipe conduit into which the main body structure is to be disposed, is a hollow cylindrical pipe, and the main body structure has a circular cross section perpendicular to the central axis thereof, the main body structure being coaxially positioned within the fluid passage or the detecting pipe conduit. Therefore, a distance between the main body structure and the inner surface of the fluid passage or the detecting pipe conduit is all the same in the circumferential direction, thereby ensuring an extremely high effect of rectifying a fluid.

Further, the support section holds the main body structure at a position which is on the downstream side of its one portion having the largest cross section area. Therefore, the support section will not hamper the flowing of the fluid which the rapidly flowing fluid portions flow diagonally over the outer surface of the main body structure so as to merge into the slowly flowing fluid portions, thereby ensuring a high fluid rectifying effect.

Moreover, the flow rate sensor further comprises a fluid rectifying means for rectifying the flowing direction of the above fluid, the fluid rectifying means being positioned downstream of the front end of the main body structure and upstream of the above detecting element. Therefore, it is sure to effectively rectify the direction of a fluid flowing through the detecting element.

In addition, the flow rate sensor further comprises a pair of fluid rectifying members for rectifying the flowing direction of the above fluid, the fluid rectifying members being arranged so as to face each other and interposing the detecting element therebetween. Therefore, there is only a small pressure loss, thus exactly rectifying the direction of a fluid flowing through the vicinity of the detecting element.

Further, a small passage is formed through the support section in a direction the above fluid flows, and the detecting element is disposed within the small passage. Therefore, the support section also serves as fluid rectifying means, thus it is not necessary to provide other fluid rectifying means. As a result, a pressure loss may be reduced.

Further, the rear end portion of the main body structure is formed into an obtuse tail shape, such that its cross section gradually becomes smaller from the upstream side towards the downstream side of the fluid. Therefore, it is possible to reduce a pressure loss on the rear end of the main body structure.

Further, the flow rate sensor comprises a plurality of support sections arranged equivalently in the circumferential direction at an equal angular interval on the inner surface of the fluid passage or the detecting pipe conduit. Therefore, a pressure loss in a circumferential direction may be made uniform, thereby ensuring a high fluid rectifying effect.

Further, since at least an area surrounding the detecting element within the fluid passage or the detecting pipe conduit has a reduced fluid flowing cross section, it is possible to improve a fluid rectifying effect by virtue of fluid contraction.

Further, since at least a part of the above control circuit is accommodated within the main body structure, it is possible to manufacture a flow rate sensor which is compact in size and thus easy to be attached to a desired place.

What is claimed is:

1. A flow rate sensor having
   a fluid passage for a fluid to flow therealong;
   a temperature sensing element for sensing a temperature of the fluid;
   a detecting element including a flow rate detecting resistance made of a thermo-sensitive electrically resistant material, said detecting element being disposed in the fluid passage so as to expose the flow rate detecting resistance to said fluid flowing therethrough; and
   a control circuit for controlling an electric current flowing into the flow rate detecting resistance such that the temperature of the flow rate detecting resistance may be maintained at a predetermined value which is higher to some extent than a fluid temperature detected by the temperature sensing element;
   wherein said flow rate sensor measures the flow rate of said fluid flowing along said fluid passage on a basis of a heat transfer phenomenon from the flow rate detecting resistance to said fluid, comprising;
   a main body structure formed such that a cross section perpendicular to a central axis becomes larger from a front end towards a rear end therefore; said main body structure supported by a support section formed protrudingly on an internal surface of said fluid passage, and positioned within said fluid passage so as to turn a front end thereof to an upstream side of said fluid and so as to turn a rear end thereof to a downstream side of said fluid,
   wherein said detecting element is disposed between said main body structure and the internal surface of said fluid passage.

2. The flow rate sensor according to claim 1, wherein the front end portion of said main body structure is formed in to an obtuse head shape, in a manner such that its cross section area becomes gradually larger from its front end towards its rear end.

3. The flow rate sensor according to claim 1, wherein said detection element is disposed in an area within said fluid passage where a space formed between an outer surface of said main body structure and the internal surface of said fluid passage is the narrowest.

4. The flow rate sensor according to claim 1, wherein said fluid passage into which said main body structure is to be disposed, is a hollow cylindrical pipe, and said main body structure has a circular cross section perpendicular to the central axis thereof, said main body structure being coaxially positioned within said fluid passage.

5. The flow rate sensor according to claim 1, wherein the support section holds said main body structure at a position which is on the downstream side of its one portion having a largest cross section area.

6. The flow rate sensor according to claim 1, further comprising a fluid rectifying means for rectifying a flowing direction of said fluid, said fluid rectifying means being positioned downstream of the front end of said main body structure and upstream of said detecting element into said fluid passage.

7. The flow rate sensor according to claim 1, further comprising a pair of fluid rectifying members for rectifying the flowing direction of said fluid, said fluid rectifying members being arranged so as to face each other and interposing said detecting element therebetween.

8. The flow rate sensor according to claim 1, wherein a small passage is formed through the support section in a direction said fluid flows, said detecting element is disposed within a small passage.

9. The flow rate sensor according to claim 1, wherein the rear end portion of said main body structure is formed into an obtuse tail shape, such that a cross section gradually becomes smaller from the upstream side towards the downstream side of said fluid.

10. The flow rate sensor according to claim 1, wherein a plurality of said support sections are arranged equivalently in a circumferential direction at an equal angular interval on the inner surface of said fluid passage.

11. The flow rate sensor according to claim 1, wherein at least an area surrounding said detecting element within said fluid passage has a reduced fluid flowing cross section.

12. The flow rate sensor according to claim 1, wherein at least a part of said control circuit is accommodated within said main body structure.

13. A flow rate sensor having
    a detecting pipe conduit adapted to be disposed in a fluid passage and suitable for a part of a fluid to flow therethrough;
    a temperature sensing element for sensing the temperature of said fluid;
    a detecting element including a flow rate detecting resistance made of a thermo-sensitive electrically resistant material, said detecting element being disposed in said detecting pipe conduit so as to expose the flow rate detecting resistance to said fluid flowing therethrough; and
    a control circuit for controlling an electric current flowing into the flow rate detecting resistance such that the temperature of the flow rate detecting resistance may be maintained at a predetermined value which is higher to some extent than a fluid temperature detected by the temperature sensing element;
    wherein said flow rate sensor measures the flow rate of said fluid flowing along said fluid passage on a basis of a heat transfer phenomenon from the flow rate detecting resistance to said fluid, comprising;
    a main body structure formed such that its cross section perpendicular to a central axis becomes larger from a front end towards a rear end therefore; said main body structure supported by a support section formed protrudingly on an internal surface of said detecting pipe conduit, and positioned within said detecting pipe conduit so as to turn a front end thereof to an upstream side of said fluid and so as to turn a rear end thereof to a downstream side of said fluid,
    wherein said detecting element is disposed between said main body structure and an internal surface of said detecting pipe conduit.

14. The flow rate sensor according to claim 13, wherein the front end portion of said main body structure is formed into an obtuse head shape, in a manner such that its cross section area becomes gradually larger from a front end towards its rear end.

15. The flow rate sensor according to claim 13, wherein said detecting element is disposed in an area within said detecting pipe conduit where a space formed between the outer surface of said main body structure and the internal surface of said detecting pipe conduit is the narrowest.

16. The flow rate sensor according to claim 13, wherein said detecting pipe conduit into which said main body structure is to be disposed, is a hollow cylindrical pipe, and said main body structure has a circular cross section perpendicular to the central axis thereof, said main body structure being coaxially positioned within said detecting pipe conduit.

17. The flow rate sensor according to claim 13, further comprising a pair of fluid rectifying members for rectifying the flowing direction of said fluid, said fluid rectifying members being arranged so as to face each other and interposing said detecting therebetween.

18. The flow rate sensor according to claim 13, wherein a small passage is formed through the support section in a direction said fluid flows, said detecting element is disposed within the small passage.

19. The flow rate sensor according to claim 13, wherein the rear end portion of said main body structure is formed into an obtuse tail shape, such that its cross section gradually becomes smaller from an upstream side towards a downstream side of said fluid.

20. The flow rate sensor according to claim 13, wherein a plurality of said support members are arranged equivalently in a circumferential direction at an equal angular interval on the inner surface of said detecting pipe conduit.

* * * * *